United States Patent
Ogata et al.

(10) Patent No.: US 11,823,845 B2
(45) Date of Patent: Nov. 21, 2023

(54) ELECTROLYTIC CAPACITOR AND METHOD FOR MANUFACTURING SAME

(71) Applicant: PANASONIC INTELLECTUAL PROPERTY MANAGEMENT CO., LTD., Osaka (JP)

(72) Inventors: Norihiko Ogata, Saga (JP); Yuma Yano, Saga (JP); Kazuhide Gotou, Saga (JP); Yukiyasu Sugihara, Aichi (JP); Masayuki Hogiri, Osaka (JP); Masahiro Ueda, Saga (JP); Kazuhito Odane, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 17/598,734

(22) PCT Filed: Feb. 26, 2020

(86) PCT No.: PCT/JP2020/007811
§ 371 (c)(1),
(2) Date: Sep. 27, 2021

(87) PCT Pub. No.: WO2020/195491
PCT Pub. Date: Oct. 1, 2020

(65) Prior Publication Data
US 2022/0172901 A1    Jun. 2, 2022

(30) Foreign Application Priority Data

Mar. 27, 2019    (JP) ................................ 2019-060209

(51) Int. Cl.
*H01G 9/012* (2006.01)
*H01G 9/028* (2006.01)
(Continued)

(52) U.S. Cl.
CPC ............ *H01G 9/012* (2013.01); *H01G 9/028* (2013.01); *H01G 9/052* (2013.01); *H01G 9/15* (2013.01); *H01G 9/0525* (2013.01)

(58) Field of Classification Search
CPC .......... H01G 9/04; H01G 9/042; H01G 9/052
See application file for complete search history.

(56) References Cited

U.S. PATENT DOCUMENTS

| | | |
|---|---|---|
| 2007/0030622 A1 | 2/2007 | Saida et al. |
| 2008/0299335 A1 | 12/2008 | Poltorak et al. |

(Continued)

FOREIGN PATENT DOCUMENTS

| | | |
|---|---|---|
| JP | S55-024457 A | 2/1980 |
| JP | H06-224091 A | 8/1994 |

(Continued)

OTHER PUBLICATIONS

Chinese Office Action with its partial English translation issued in the corresponding Chinese Patent Application No. 202080024652.2, dated Jul. 21, 2022.

(Continued)

*Primary Examiner* — Eric W Thomas
(74) *Attorney, Agent, or Firm* — McDermott Will & Emery LLP

(57) ABSTRACT

An electrolytic capacitor including a capacitor element that includes an anode body being porous, a dielectric layer formed on the surface of the anode body, and a solid electrolyte layer covering at least part of the dielectric layer. The anode body has a plurality of principal surfaces and a corner portion. The corner portion includes a plurality of side portions connecting between the principal surfaces, and one or more vertex portions connecting between the principal surfaces. A surface layer X of at least part of the corner (Continued)

portion is more compact in texture than a surface layer Y of the principal surface adjacent to the surface layer X.

16 Claims, 3 Drawing Sheets

(51) Int. Cl.
  *H01G 9/15* (2006.01)
  *H01G 9/052* (2006.01)

(56) References Cited

U.S. PATENT DOCUMENTS

| | | | |
|---|---|---|---|
| 2008/0299371 A1* | 12/2008 | Poltorak | H01G 11/48 428/220 |
| 2009/0237866 A1* | 9/2009 | Okada | H01G 9/012 361/540 |
| 2018/0324953 A1 | 11/2018 | Onitsuka | |

FOREIGN PATENT DOCUMENTS

| | | | |
|---|---|---|---|
| JP | H07-22291 A | | 1/1995 |
| JP | 07220984 A | * | 8/1995 |
| JP | H07-230937 A | | 8/1995 |
| JP | 10106899 A | * | 4/1998 |
| JP | 2000348985 A | * | 12/2000 |
| JP | 2001-167985 A | | 6/2001 |
| JP | 2006-332631 A | | 12/2006 |
| JP | 2009-182157 A | | 8/2009 |
| JP | 2017-022221 A | | 1/2017 |
| WO | 2017/183688 A1 | | 10/2017 |

OTHER PUBLICATIONS

International Search Report and Written Opinion issued in International Patent Application No. PCT/JP2020/007811, dated Jun. 2, 2020; with partial English translation.

Japanese Office Action dated Oct. 3, 2023 issued in the corresponding Japanese Patent Application No. 2021-508843, with English translation.

* cited by examiner

ELECTROLYTIC CAPACITOR AND METHOD FOR MANUFACTURING SAME

CROSS-REFERENCE OF RELATED APPLICATIONS

This application is the U.S. National Phase under 35 U.S.C. § 371 of International Patent Application No. PCT/JP2020/007811, filed on Feb. 26, 2020, which in turn claims the benefit of Japanese Application No. 2019-060209, filed on Mar. 27, 2019, the entire disclosures of which Applications are incorporated by reference herein.

TECHNICAL FIELD

The present invention relates to an electrolytic capacitor and a production method of the same.

BACKGROUND ART

Electrolytic capacitors, which have low equivalent series resistance (ESR) and excellent frequency characteristics, are used in various electronic devices. An electrolytic capacitor typically includes a capacitor element including an anode section and a cathode section. The anode section includes an anode body being porous, and on the surface of the anode body, a dielectric layer is formed. The dielectric layer contacts an electrolyte. An electrolytic capacity including a solid electrolyte, such as conductive polymer, as an electrolyte is known (e.g., Patent Literature 1).

CITATION LIST

Patent Literature

[PTL 1] Japanese Laid-Open Patent Publication No. 2009-182157

SUMMARY OF INVENTION

Technical Problem

The reliability of an electrolytic capacitor including a solid electrolyte is to be improved.

Solution to Problem

One aspect of the present invention relates to an electrolytic capacitor, including a capacitor element including an anode body being porous, a dielectric layer formed on a surface of the anode body, and a solid electrolyte layer covering at least part of the dielectric layer, wherein the anode body has a plurality of principal surfaces and a corner portion, the corner portion includes a plurality of side portions and a vertex portion, the side portions and the vertex portion each connecting between the principal surfaces, and a surface layer X of at least part of the corner portion is more compact in texture than a surface layer Y of the principal surface adjacent to the surface layer X.

Another aspect of the present invention relates to a production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method including steps of: preparing the anode body; covering at least part of the anode body with the dielectric layer; and covering at least part of the dielectric layer with the solid electrolyte layer, wherein the anode body has a plurality of principal surfaces and a corner portion, the corner portion including a plurality of side portions and a vertex portion, the side portions and the vertex portion each connecting between the principal surfaces, and the step of preparing the anode body includes a step of irradiating a laser beam to at least part of the corner portion.

Yet another aspect of the present invention relates to a production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method including steps of: preparing the anode body; covering at least part of the anode body with the dielectric layer; and covering at least part of the dielectric layer with the solid electrolyte layer, wherein the anode body has a plurality of principal surfaces and a corner portion, the corner portion including a plurality of side portions and a vertex portion, the side portions and the vertex portion each connecting between the principal surfaces, and the step of preparing the anode body includes a step of allowing media particles to collide with at least part of the corner portion.

Still another aspect of the present invention relates to a production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method including steps of: preparing the anode body; covering at least part of the anode body with the dielectric layer; and covering at least part of the dielectric layer with the solid electrolyte layer, wherein the anode body has a plurality of principal surfaces and a corner portion, the corner portion including a plurality of side portions and a vertex portion, the side portions and the vertex portion each connecting between the principal surfaces, and the step of preparing the anode body includes a step of subjecting the anode body to vibration together with a vibration member.

Advantageous Effects of Invention

The reliability of the electrolytic capacitor can be improved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

[Electrolytic Capacitor]

Figure 1:
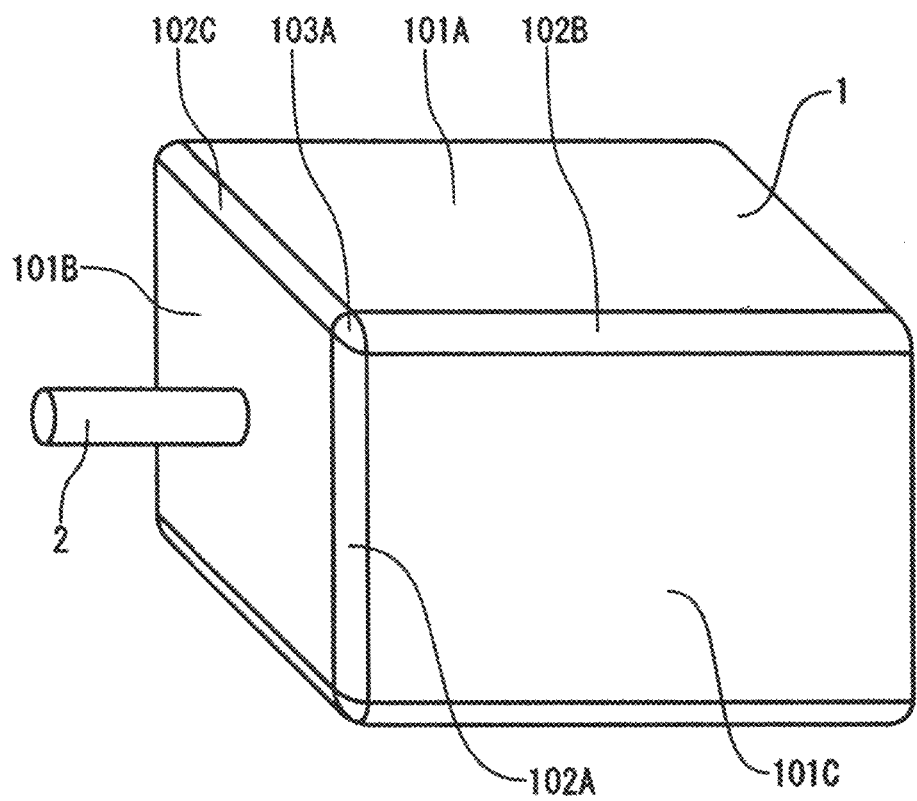
FIG. 1 A schematic oblique view showing the shape of an anode body used for an electrolytic capacitor according to an embodiment of the present invention.

An electrolytic capacitor according to an embodiment of the present invention includes a capacitor element that includes an anode body being porous, a dielectric layer formed on the surface of the anode body, and a solid electrolyte layer covering at least part of the dielectric layer. The anode body has a plurality of principal surfaces and a corner portion. The corner portion includes, for example, a plurality of side portions connecting between the principal surfaces, and one or more vertex portions connecting between the principal surfaces. The corner portion at least partially has a curved surface or is chamfered.

By configuring the anode body such that the side portions and/or the vertex portions at least partially have a curved surface or is chamfered, damage to the dielectric layer at the corner portion can be suppressed, and an electrolytic capacitor having a small leakage current can be realized. Therefore, the reliability of the electrolytic capacitor can be enhanced.

The side portion refers to a region including a side and its vicinity where two principal surfaces of the anode body meet. The vertex portion refers to a region including a vertex and its vicinity at which three principal surfaces of the anode body meet. Here, the side portion and the vertex portion are collectively referred to as the "corner portion." That the corner portion at least partially has a curved surface or is chamfered means that, for example, at least one side portion, and/or, at least one vertex portion has a curved surface or is chamfered. This includes a case where one side portion partially has a curved surface or is chamfered.

That the corner portion at least partially has a "curved surface" includes a case where a cross-sectional shape of the corner portion is a curved line, but not limited thereto. For example, a cross-sectional shape of the corner portion may be a polygonal curve having a plurality of obtuse angles. When the cross-sectional shape is convex, and, in the cross-sectional shape, two straight lines: one corresponding to one principal surface and one corresponding to another principal surface adjacent thereto, are connected via at least one straight line and/or a curved line, it can be said that the corner portion has a curved surface. In other words, that the corner portion has a "curved surface" also means that the cross-sectional shape of the corner portion taken perpendicular to the adjacent two principal surfaces has no sharp-angled region of 90° or less.

The dielectric layer is usually formed by subjecting the anode body to chemical conversion, so that an oxide film grows on the surface of the anode body. Therefore, the properties of the dielectric layer formed through chemical conversion are affected by the surface condition of the anode body before the chemical conversion.

The anode body is usually shaped like a rectangular parallelepiped. In this case, in the vicinity of a side connecting between two orthogonal principal surfaces of the rectangular parallelepiped, and/or, the vicinity of a vertex at which three orthogonal principal surfaces of the rectangular parallelepiped meet (i.e., the corner portion), the surface of the anode body is not flat when viewed microscopically, which tends to be highly roughened and have an uneven contour. When the dielectric layer is grown by chemical conversion in this state, defects tend to occur at the uneven area in the dielectric layer. Defects in the dielectric layer, if any, may form a channel through which a current flows between the solid electrolyte and a valve action metal via the defect portions, which may cause the leakage current to increase.

Furthermore, the anode body is porous, and therefore, is brittle and apt to collapse. Especially at the corner portion of the anode body, the mechanical strength is low as compared to the portions other than the corner portion, and the thermal stress tends to concentrate thereon. When the porous portion is damaged, the dielectric layer covering the porous portion may also be damaged. A damage to the dielectric layer may cause the leakage current to increase.

In the electrolytic capacitor of the present embodiment, at least part of the corner portion of the anode body is formed into a curved surface. Therefore, the defects that may occur in the dielectric layer during chemical conversion can be reduced. As a result, the leakage current can be reduced. Also, the mechanical strength can be increased, and the concentration of the thermal stress can be reduced. This can suppress the damage to the dielectric layer after the chemical conversion. As a result, the increase in leakage current can be suppressed.

A solid electrolyte layer is formed so as to cover the dielectric layer. When the corner portion of the anode body has no curved surface, the solid electrolyte layer tends to be formed thin at the corner portion. Especially when the solid electrolyte layer contains a conductive polymer, and the conductive polymer is formed by chemical polymerization, the solid electrolyte layer tends to be formed thin at the corner portion. However, by forming at least part of the corner portion into a curved surface, the solid electrolyte layer is unlikely to be thin at the corner portion, and the solid electrolyte layer can be formed in a uniform thickness. Therefore, in the electrolytic capacitor, the strength against external stress can be increased, and the increase in leakage current and the occurrence of short-circuit failure can be suppressed. Also, the withstand voltage can be improved.

A surface layer X of at least part of the corner portion may be more compact in texture than a surface layer Y of the principal surface adjacent to the surface layer X. The surface layer Y is a surface layer of the principal surface adjacent to the corner portion, and usually, the porous anode body is exposed therefrom. By forming the surface layer X of the corner portion compactly in texture, the mechanical strength of the corner portion can be further enhanced. Thus, the increase in leakage current via the corner portion can be effectively suppressed.

When the surface layer X of at least part of the corner portion is compactly formed in texture, the compact surface layer X may not be a curved surface, or may not be a chamfered surface layer. Even when the corner portion neither has a curved surface nor is chamfered, sufficient mechanical strength can be obtained by compactly forming the surface layer X of the corner portion. Therefore, the increase in leakage current via the corner portion can be suppressed. It is preferable, however, that a portion including the surface layer X at least partially has a curved shape or a chamfered shape because this can further suppress the leakage current. In this case, the surface layer Y may be a region adjacent to the portion having a curved shape or a chamfered shape of the surface layer X.

That the surface layer X is more compact in texture than the surface layer Y means that, for example, a porosity $P_1$ in the surface layer X is smaller than a porosity $P_2$ in the surface layer Y. The surface layer X may have a portion in which the porosity $P_1$ is, for example, 10% or less. In contrast, the porosity $P_2$ in the surface layer Y is usually 20% or more.

The surface layer X and the surface layer Y may have a portion in which a ratio $P_2/P_1$ of the porosity $P_2$ to the porosity $P_1$ satisfies 5 or more. The $P_2/P_1$ may be 10 or more, or 50 or more. A portion of the surface layer X and a portion of the surface layer Y may have a $P_2/P_1$ satisfying 5 or more.

When at least part of the corner portion has a curved surface, the curvature of the curved surface is, for example, 0.002 (1/μm) to 0.05 (1/μm), and more preferably, 0.005 (1/μm) to 0.02 (1/μm).

The curvature and the porosity can be determined by image analysis of a cross-sectional photograph of the anode body in a predetermined region. In an electron micrograph of the cross section, the area of the void portion in a random region A in the surface layer X is measured, and the ratio of the area of the void portion to the region A is determined as the porosity $P_1$. Similarly, the area of the void portion in a random region B in the surface layer Y is measured, and the ratio of the area of the void portion to the region B is determined as the porosity $P_2$.

The corner portion having a curved surface may be formed by compression-molding the anode body using a mold having a curved surface, or may be formed by partially removing the corner portion of the anode body. By irradiating a laser beam to the corner portion, however, a curved surface can be formed, and/or, a surface layer of the corner portion can be formed compactly. The irradiation of a laser beam melts the surface layer X of the corner portion. The surface layer X after the laser beam irradiation is a molten layer formed as a result of melting of the porous portion of the anode body, and can be formed more compact than the porous surface layer Y. The porosity $P_1$ of the surface layer X formed by laser beam irradiation is extremely small, and can be, for example, 1% or less.

Alternatively, the corner portion may be formed into a curved surface by placing the anode body on a vibration member, such as a sieve or media particles, and vibrating the vibration member. In this case, the vibration allows the corner portion of the anode body to collide with the vibration member, so that the corner portion is compressed by the collision, and the corner portion is formed into a curved shape. In this way, the surface layer X of the corner portion can be formed more compactly (more densely) than the surface layer Y of the principal surface that can remain porous.

Of the corner portions, a portion having a curved shape or a chamfered shape includes, for example, a portion having a radius of curvature R of 20 μm to 500 μm, and more preferably includes a portion having a radius of curvature R of 50 μm to 200 μm. Here, the radius of curvature of the corner portion can be measured by photographing an image of the anode body from one principal surface side, and image-analyzing the contour shape in the vicinity of the obtained corner portion (vertex). The radius of curvature R can be regarded as a distance from a boundary to a vertex position (the point of intersection between the side portions) before the curved surface forming (before the chamfering) in the contour line of the anode body, where the boundary is between a region having a curved surface (chamfered region) and a side portion having no curved surface (non-chamfered portion). With respect to each of the side portions of the anode body, the radius of curvature R may be measured, to calculate an average of the measured values. For example, when the anode body is an approximate rectangular parallelepiped in shape, the radius of curvature R is measured at both ends of each of the twelve side portions, and an average of the total 24 radii of curvature R is determined. By using the vibration member, an anode body whose average radius of curvature R is in the above range can be easily obtained.

In the corner portion of the anode body, a portion having a curved shape or a chamfered shape may include portions differing in the above radius of curvature R. In this case, the variation in the radius of curvature R of the plurality of corner portions in the anode body can be, for example, 350 μm or less, and more preferably 150 μm or less. The variation in the radius of curvature R means a difference between maximum and minimum of the radii of curvature R of the corner portions determined in the above-described manner (when the anode body is an approximate rectangular parallelepiped in shape, a difference between maximum and minimum of the measured 24 radii of curvature).

FIG. 1 is a schematic oblique view of an example of an anode body used for an electrolytic capacitor according to an embodiment of the present invention. As illustrated in FIG. 1, an anode body 1 has an approximate rectangular parallelepiped shape, and six principal surfaces are exposed. Here, three principal surfaces 101A to 101C are labeled as shown, while the other three principal surfaces are on the hidden position without labeling.

With respect to the six principal surfaces of the anode body 1, in the vicinity of a side where adjacent two principal surfaces meet, a connection surface is formed by reducing the sharpness at the side portion. In the illustrated example in FIG. 1, a connection surface 102C is between the principal surfaces 101A and 101B, a connection surface 102A is between the principal surfaces 101B and 101C, and a connection surface 102B is between the principal surfaces 101A and 101C. In the vicinity of a vertex where three principal surfaces meet, a second connection surface is formed by reducing the sharpness at the vertex portion. The illustrated example in FIG. 1 has a second connection surface 103A at the vertex portion where the principal surfaces 101A to 101C meet. The second connection surface 103A mutually connects the connection surfaces 102A to 102C. The connection surfaces 102A to 102C and the second connection surface 103A are processed into a rounded curved surface. The connection surfaces 102A to 102C and the second connection surface 103A may be a curved surface, and may be constituted of one or more flat surfaces (e.g., by chamfering the corner portion).

As described above, since the anode body 1 has a shape from which sharp-angled portions are removed, a dielectric layer with less defects can be formed on the surface of the anode body 1, and as a result, the leakage current can be reduced. Also, the mechanical strength of the anode body can be increased, and the concentration of thermal stress can be reduced. As a result, the damage to the dielectric layer can be suppressed, an increase in leakage current due to the damage to the dielectric layer can be suppressed, and the leakage current can be maintained small.

The surface layers of the connection surfaces 102A to 102C and/or the second connection surface 103A may be formed more compactly than those of the six principal surfaces of the anode body 1 which are porous. In other words, the porosity $P_1$ in the surface layers of the connection surfaces 102A to 102C and/or the second connection surface 103A may be smaller than the porosity $P_2$ in the surface layers of the six principal surfaces of the anode body 1. In this case, the mechanical strength at the corner portions of the anode body can be further increased.

An anode wire 2 is extended from the principal surface 101B of the anode body 1. The anode body 1 and the anode wire 2 constitute an anode section 6.

Figure 2:
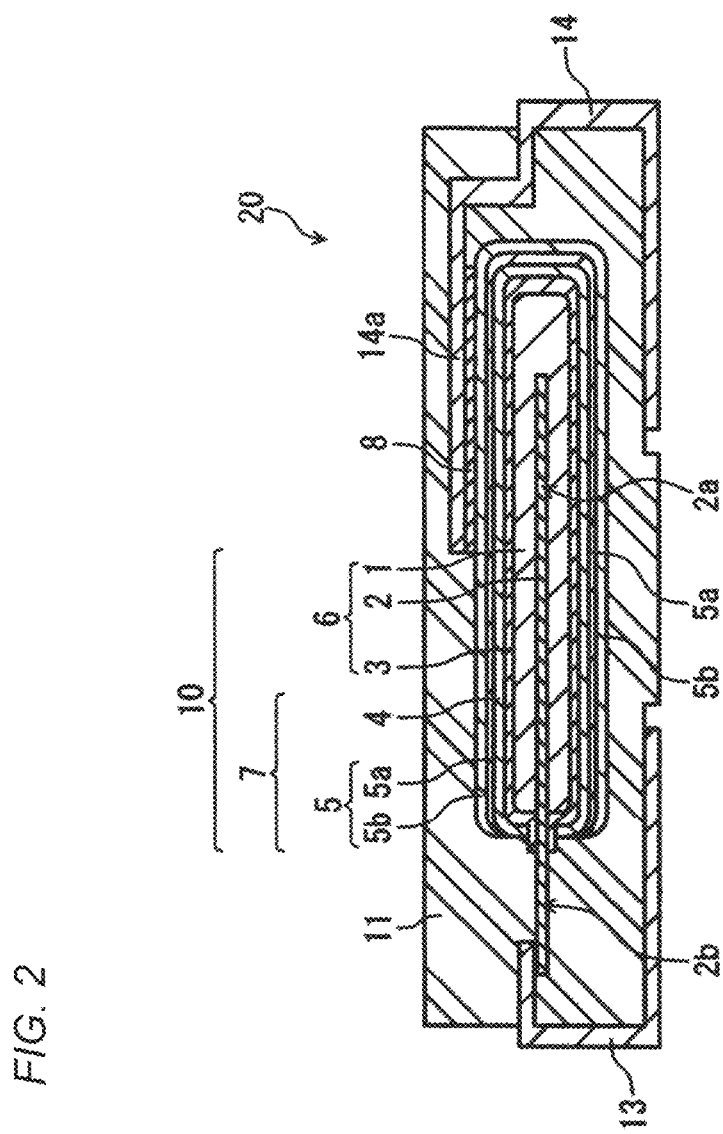
FIG. 2 A schematic cross-sectional view of an electrolytic capacitor according to an embodiment of the present invention.

A description will be given below of a configuration of an electrolytic capacitor according to the present embodiment, with reference to the drawings as appropriate. The present invention, however, is not limited thereto. FIG. 2 is a schematic cross-sectional view of an electrolytic capacitor according to the present embodiment.

An electrolytic capacitor 20 includes: a capacitor element 10 having an anode section 6 and a cathode section 7; a package body 11 encapsulating the capacitor element 10; an anode lead terminal 13 electrically connected to the anode section 6 and partially exposed from the package body 11; and a cathode lead terminal 14 electrically connected to the cathode section 7 and partially exposed from the package body 11. The anode section 6 has an anode body 1 and an anode wire 2. A dielectric layer 3 is formed on the surface of the anode body. The cathode section 7 has a solid electrolyte layer 4 covering at least part of the dielectric layer 3, and a cathode layer 5 covering the surface of the solid electrolyte layer 4.

<Capacitor Element>

The capacitor element 10 will be specifically described below, with reference to an example of including a solid electrolyte layer as an electrolyte.

The anode section 6 has the anode body 1 and the anode wire 2 extending from one surface of the anode body 1 and electrically connected to the anode lead terminal 13.

The anode body 1 is, for example, a rectangular parallelepiped porous sintered body obtained by sintering metal particles. The metal particles used here are particles of a valve action metal, such as titanium (Ti), tantalum (Ta), and niobium (Nb). One or more kinds of metal particles are used for the anode body 1. The metal particles may be of an alloy of two or more kinds of metals. For example, an alloy containing a valve action metal and one or more other metals, such as silicon, vanadium, and boron can be used. A compound containing a valve action metal and a typical element, such as nitrogen, may be used. The alloy of a valve action metal is mainly composed of the valve action metal, and contains the valve action metal in an amount of, for example, 50 atom % or more.

The anode wire 2 is constituted of an electrically conductive material. The material of the anode wire 2 is not limited, and may be, for example, the valve action metal as described above, copper, aluminum, an aluminum alloy, and the like. The materials constituting the anode body 1 and the anode wire 2 may be of the same kind or different kinds. The anode wire 2 has a first portion 2a extending into the anode body 1 from one surface of the anode body 1, and a second portion 2b extending outside from the above one surface of the anode body 1. The anode wire 2 may have any cross sectional shape, such as a circular shape, a track shape (a shape composed of straight lines parallel to each other and two curves connecting the ends of the straight lines), an elliptical shape, a rectangular shape, and a polygonal shape.

The anode section 6 can be formed by, for example, compression-molding a powder of the metal particles as described above, with the first portion 2a embedded therein, into a rectangular parallelepiped shape, followed by sintering. In this way, the second portion 2b of the anode wire 2 is extended outside so as to stand upright from one surface of the anode body 1. The second portion 2b is joined to the anode lead terminal 13 by welding or the like, providing electrical connection between the anode wire 2 and the anode lead terminal 13. The method of welding is not limited, and may be, for example, resistance welding, laser welding, and the like. This may be followed by a processing of forming a curved surface at the corner portions of the rectangular parallelepiped.

A dielectric layer 3 is formed on the surface of the anode body 1. The dielectric layer 3 is constituted of, for example, a metal oxide. As a method of forming a layer containing a metal oxide on the surface of the anode body 1, for example, a method of immersing the anode body 1 in a chemical conversion solution, thereby to anodize the surface of the anode body 1, or a method of heating the anode body 1 in an atmosphere containing oxygen may be adopted. The dielectric layer 3 is not limited to the above layer containing a metal oxide, and may be any layer that has electrical insulating properties.

(Cathode Section)

The cathode section 7 has a solid electrolyte layer 4 and a cathode layer 5 covering the solid electrolyte layer 4. The solid electrolyte layer 4 is formed so as to cover at least part of the dielectric layer 3.

For the solid electrolyte layer 4, for example, a manganese compound or a conductive polymer is used. Examples of the conductive polymer include polypyrrole, polythiophene, polyfuran, polyaniline, and polyacetylene. These may be used singly or in combination of two or more kinds. The conductive polymer may be a copolymer of two or more kinds of monomers. In terms of their excellent conductivity, polythiophene, polyaniline, and polypyrrole may be used. In particular, in terms of its excellent water repellency, polypyrrole may be used.

The solid electrolyte layer 4 containing the above conductive polymer can be formed by, for example, polymerizing a raw material monomer on the dielectric layer 3. Alternatively, it can be formed by applying a liquid containing the above conductive polymer onto the dielectric layer 3. The solid electrolyte layer 4 is constituted of one layer or two or more layers of the solid electrolyte layer. When the solid electrolyte layer 4 is constituted of two or more layers, the composition, the forming method (polymerization method) and the like of the conductive polymer contained in each layer may be different from layer to layer.

In the present specification, the polypyrrole, polythiophene, polyaniline, and the like each refer to a polymer whose basic skeleton is polypyrrole, polythiophene, polyaniline, or the like, respectively. Accordingly, the polypyrrole, polythiophene, polyaniline, and the like may include their derivatives. For example, the polythiophene includes poly(3,4-ethylenedioxythiophene).

In order to improve the electrical conductivity of the conductive polymer, various dopants may be added to a polymerization liquid for forming the conductive polymer, a solution or a dispersion of the conductive polymer. The dopant is not limited, and may be, for example, naphthalene sulfonic acid, p-toluenesulfonic acid, polystyrene sulfonic acid, and the like.

When the conductive polymer is dispersed in the form of particles in the dispersion medium, the average particle diameter D50 of the particles is, for example, 0.01 μm or more and 0.5 μm or less. When the average particle diameter D50 is in this range, the particles can easily enter into inside the anode body 1.

The cathode layer 5 includes, for example, a carbon layer 5a formed so as to cover the solid electrolyte layer 4, and a metal paste layer 5b formed on the surface of the carbon layer 5a. The carbon layer 5a contains a conductive carbon material, such as graphite, and a resin. The metal paste layer 5b contains, for example, metal particles (e.g., silver) and a resin. The configuration of the cathode layer 5 is not limited thereto. The cathode layer 5 may have any configuration that has a current collecting function.

<Anode Lead Terminal>

The anode lead terminal 13 is electrically connected to the anode body 1 via the second portion 2b of the anode wire 2. The material of the anode lead terminal 13 may be any material that is electrochemically and chemically stable and has electrical conductivity. The anode lead terminal 13 may be, for example, a metal, such as copper, or a non-metal. The shape is not limited as long as it is a flat plate-like shape. In view of reduction in height, the thickness of the anode lead terminal 13 (the distance between the principal surfaces of the anode lead terminal 13) may be 25 μm or more and 200 μm or less, and may be 25 μm or more and 100 μm or less.

One end of the anode lead terminal 13 may be joined to the anode wire 2 with a conductive adhesive or solder, or may be joined to the anode wire 2 by resistance welding or laser welding. The other end of the anode lead terminal 13 is guided outside the package body 11 and exposed from the package body 11. The conductive adhesive is, for example, a mixture of a thermosetting resin as described hereinafter and carbon or metal particles.

<Cathode Lead Terminal>

The cathode lead terminal 14 is electrically connected to the cathode section 7 at a joint area 14a. The joint area 14a is an area where, when the cathode layer 5 and the cathode lead terminal 14 joined to the cathode layer 5 are viewed from a direction normal to the cathode layer 5, the cathode layer 5 and the cathode lead terminal 14 are overlapping with each other.

The cathode lead terminal 14 is joined to the cathode layer 5 via, for example, an electrically conductive adhesive 8. One end of the cathode lead terminal 14 constitutes, for example, part of the joint area 14a, and is disposed inside the package body 11. The other end of the cathode lead terminal 14 is guided outside. Therefore, part of the cathode lead terminal 14 including the other end is exposed from the package body 11.

The material of the cathode lead terminal 14 also may be any material that is electrochemically and chemically stable and has electrical conductivity. The cathode lead terminal 14 may be, for example, a metal, such as copper, or a non-metal. The shape is not limited, and is, for example, a long and flat plate-like shape. In view of reduction in height, the thickness of the cathode lead terminal 14 may be 25 μm or more and 200 μm or less, and may be 25 μm or more and 100 μm or less.

<Package Body>

The package body 11 is provided in order to electrically insulate the anode lead terminal 13 from the cathode lead terminal 14, and is constituted of an electrically insulating material (package body material). The package body material includes, for example, a thermosetting resin. Examples of the thermosetting resin include epoxy resin, phenol resin, silicone resin, melamine resin, urea resin, alkyd resin, polyurethane, polyimide, and unsaturated polyester.

<<Production Method of Electrolytic Capacitor>>

A description will be given below of an exemplary production method of an electrolytic capacitor according to the present embodiment.

The production method of an electrolytic capacitor is a method for producing a solid electrolytic capacitor that includes a capacitor element including an anode body being porous, a dielectric layer formed on the surface of the anode body, and a solid electrolyte layer covering at least part of the dielectric layer. The method includes steps of: preparing the anode body; covering at least part of the anode body with the dielectric layer; and covering at least part of the dielectric layer with the solid electrolyte layer. The anode body has a plurality of principal surfaces and a corner portion. The corner portion includes a plurality of side portions connecting between the principal surfaces, and a vertex portion connecting between the principal surfaces. The step of preparing the anode body includes a step of forming a curved surface in at least part of the corner portion or chamfering at least part of the corner portion.

(1) Preparation Step of Anode Body

As an anode body 1, a porous sintered body can be used. Particles of a valve action metal and an anode wire 2 are put into a mold, with a first part 2a embedded in the valve action metal particles, and in this state, they are compression-molded. This is followed by sintering, to obtain an anode section 6 including the anode body 1 which is a porous body of the valve action metal. The first portion 2a of the anode wire is extended into the porous body from one surface thereof. The pressure at the compression molding is not limited. The sintering is preferably carried out under reduced pressure. The valve action metal particles may be mixed with a binder, such as polyacrylic carbonate, if necessary.

The valve action metal particles are usually compression-molded and sintered using a mold having an internal space having a rectangular parallelepiped shape. In this case, the shape of the anode body 1 after sintering is also rectangular parallelepiped, and has a plurality of principal surfaces. In this case, the principal surfaces are directly connected to each other, forming sides and vertexes. The tip end of corner portions, that is, the side portions and/or the vertex portions connecting between the principal surfaces, are sharp-angled.

The anode body having a sharp-angled tip end may be processed to form a curved surface in at least part of the corner portion, or to chamfer at least part of the corner portion. This can reduce the sharpness of the tip end, and the tip end can be processed, for example, into a rounded shape. The processing of forming a curved surface in the corner portion can be carried out by, for example, scraping off part of the corner portion, to remove the tip end.

In the processing process of forming a curved surface in at least part of the corner portion or chamfering at least part of the corner portion, at least part of the corner portion may be highly densely formed. For example, by irradiating a laser beam to the corner portion, the corner portion can be formed into a curved surface, and at least part of the corner portion can be highly densely formed. Alternatively, the anode body may be subjected to vibration together with a vibration member. In association with the vibration, the anode body, especially the corner portion thereof, collides with the vibration member, and the corner portion can be compressed into a curved surface, and at least part of the corner portion can be highly densely formed.

A curved surface may be formed at the corner portion by irradiating a laser beam to the corner portion. The laser beam irradiation to the corner portion melts the corner portion, and the tip end can change its sharp-angled shape into a shape having a curved surface. The molten layer formed after melting is more compact in texture than the porous portion of the anode body and is extremely low in porosity. Therefore, the mechanical strength of the corner portion can be significantly increased, and the damage to the dielectric layer at the corner portion can be highly effectively suppressed. The thickness of the molten layer is, for example, 1 μm to 100 μm.

The laser used for laser irradiation is not limited, but may be, for example, a YAG (Yttrium Aluminum Garnet) laser (wavelength: 1064 nm).

In view of allowing the air to easily exit from the pores of the anode body when forming a solid electrolyte layer, it is preferable that the laser beam irradiation is performed on the corner portion, and the laser beam is not substantially irradiated to the principal surfaces of the anode body adjacent to the corner portion. Note that the above description means that most of the principal surface is not irradiated with the laser beam, and does not exclude the case where the laser beam is irradiated to part of the principal surface (e.g., a region near the corner portion on the principal surface).

The irradiation of the laser beam may be performed on the anode body after sintering, and may be performed on the compression-molded valve action metal particles before sintering. With taking into consideration deformation associated with shrinkage in volume after sintering, however, it is preferable to irradiate the laser beam to the anode body after sintering.

When the anode body is subjected to vibration together with a vibration member, for example, the removal of the tip end may be carried out by placing the anode body on, for example, a pedestal (vibration member) having irregularities on its surface, such as a sieve or a file, and vibrating the pedestal in the up and down and/or side to side direction. As the pedestal vibrates, the anode body rolls and moves while jumping over the pedestal. In association therewith, the tip end of the corner portion is partially scraped off, and a curved surface is formed at the corner portion. However, most of the tip end can remain in a compressed state, without being scraped off, at a surface layer of the corner portion. As a result, the surface layer of the corner portion having a curved surface can be highly densely formed. The pedestal may be a sieve because the scraped powder of the tip end can fall therethrough and easily removed, and the coefficient of static friction is moderately small so that the anode body can easily roll and move thereon. The mesh size of the sieve is less than the minimum value of the outer diameter of the anode body so that the anode body will not pass and fall through the mesh of the sieve. The mesh size of the sieve may be 1 mm or more, and may be 2 mm or more and 3.4 mm or less. When the mesh size is 1 mm or more, the variation in the radius of curvature R at the corner portion can be easily reduced to a certain value or less.

With the anode body placed on media particles, an external force may be allied to the media particles, thereby to subjecting the anode body to vibration together with the media particles. For example, the anode body may be mixed with media particles, and the anode body may be fed together with the media particles into a shaker, and the shaker may be operated. The shaker is preferably capable of giving a vibration in the vertical direction, in addition to the horizontal direction. The media particles may be alumina particles, zirconia particles, and the like. The particle size (average particle diameter) of the media particles is, for example, 0.1 mm to 3 mm, and may be 0.5 mm to 2 mm.

The media particles fed into the shaker together with the anode body are caused to vibrate by the operation of the shaker, to collide with the anode body. The corner portion of the anode body is low in mechanical strength and is susceptible to deformation due to the collision, and the porous portion of the corner portion easily collapses and is compressed. In this way, the surface layer of the corner portion can be highly densely formed.

The density of the media particles may be 0.15 to 0.4 times as high as the density (true density) of the anode body. When the density of the media particles is in the above range, the energy produced by the collision of the media particles can be utilized efficiently in the compression defor-mation of the corner portion. In addition, the ratio of the corner portion to be scraped off by the collision can be reduced.

In the method of vibrating the media particles in a state where the media particles are mixed with the anode body, as compared to the method of vibrating the sieve with the anode body placed thereon, the formation of a curved surface or chamfering in the corner portion can be done in a shorter time. Therefore, the variation in the radius of curvature R in the corner portion can be easily reduced.

When the curved surface formation or chamfering in the corner portion is carried out using a vibration member, the curved surface formation or chamfering is preferably performed on the porous body before sintering, because sintering increases the mechanical strength, making the corner portion difficult to be compressed.

It is also possible to obtain an anode body having a curved surface at the corner portion by performing the compression molding of valve action metal particles using a mold from which the sharpness of the corner portions has been reduced in advance, followed by sintering.

(2) Formation Step of Dielectric Layer

Next, the anode body 1 is subjected to chemical conversion, to cover at least part of the anode body 1 with a dielectric layer 3. Specifically, the anode body 1 is immersed in a chemical conversion tank filled with an electrolytic aqueous solution (e.g., aqueous phosphoric acid solution), and a second portion 2b of the anode wire 2 is connected to an anode body of the chemical conversion tank, to perform anodization. Thus, the dielectric layer 3 composed of an oxide film of the valve action metal can be formed on the surface of the porous portion. The electrolytic aqueous solution is not limited to an aqueous phosphoric acid solution, and may be nitric acid, acetic acid, sulfuric acid or the like.

(3) Formation Step of Solid Electrolyte Layer

Subsequently, at least a part of the dielectric layer 3 is covered with a solid electrolyte layer 4. Thus, the capacitor element 10 including the anode body 1, the dielectric layer 3, and the solid electrolyte layer 4 can be obtained.

The solid electrolyte layer 4 including a conductive polymer can be formed on at least part of the dielectric layer 3 by, for example, impregnating the anode body 1 having the dielectric layer 3 formed thereon, with a monomer or oligomer, and then polymerizing the monomer or oligomer by chemical polymerization or electrolytic polymerization, or by impregnating the anode body 1 having the dielectric layer 3 formed thereon, with a solution or dispersion of a conductive polymer, followed by drying.

The solid electrolyte layer 4 can be formed by, for example, impregnating the anode body 1 having the dielectric layer 3 formed thereon, with a dispersion containing a conductive polymer, a binder, and a dispersion medium, and taking out the anode body and drying. The dispersion may include a binder, and/or electrically conductive inorganic particles (e.g., a conductive carbon material, such as carbon black). The conductive polymer may include a dopant. The conductive polymer and the dopant may be respectively selected from those exemplified for the solid electrolyte layer 4. The binder can be any known binder. The dispersion may include known additives used for forming a solid electrolyte layer.

Subsequently, a cathode layer 5 composed of a carbon layer 5a and a metal paste layer 5b is formed by applying a carbon paste and a metal paste in this order onto a surface of the solid electrolyte layer 4. The configuration of the cathode layer 5 is not limited thereto, and may be any configuration that has a current collecting function.

Next, an anode lead terminal 13 and a cathode lead terminal 14 are prepared. The second portion 2b of the anode wire 2 standing upright from the anode body 1 is joined to the anode lead terminal 13 by laser welding, resistance welding, or the like. After a conductive adhesive 8 is applied onto the cathode layer 5, the cathode lead terminal 14 is joined to a cathode section 7 via the conductive adhesive 8.

Subsequently, the capacitor element 10 and a material (e.g., uncured thermosetting resin and filler) of a package body 11 are placed in a mold, which are then subjected to transfer molding, compression molding, or the like, to encapsulate the capacitor element 10. At this time, the anode lead terminal 13 and the cathode lead terminal 14 are each partially exposed from the mold. The molding conditions are not limited, and the time and temperature conditions may be set as appropriate, with taking into consideration the curing temperature or the like of the thermosetting resin used.

Lastly, the exposed portions of the anode lead terminal 13 and the cathode lead terminal 14 are each bent along the package body 11 to form a bent portion. Thus, the anode lead terminal 13 and the cathode lead terminal 14 are each partially disposed on the mounting surface of the package body 11.

By the foregoing method, an electrolytic capacitor 20 is produced.

Figure 3:
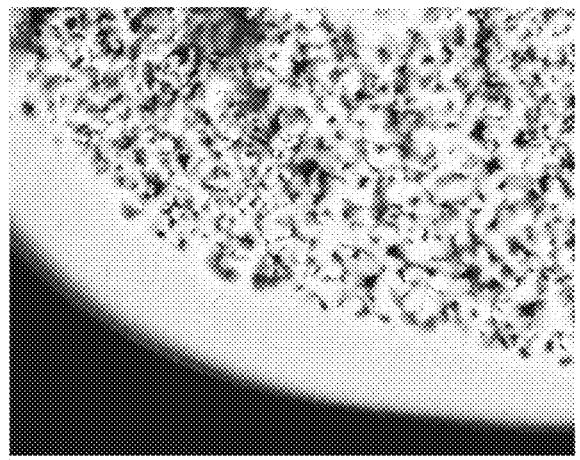
FIG. 3 An electron micrograph of a cross section of a corner portion of the anode body after laser beam irradiation.

FIG. 3 is an electron micrograph of a cross section of a corner portion of the anode body after laser beam irradiation. In FIG. 3, the white area indicates the presence of a valve action metal (Ta), and the black area indicates a void. The corner portion has a curved surface, and the surface layer X of the corner portion having a curved surface is compactly formed. On the other hand, the inside of the surface layer X maintains its porous state.

INDUSTRIAL APPLICABILITY

The present invention is applicable to an electrolytic capacitor, and preferably can be utilized for an electrolytic capacitor including a porous body as an anode body.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

20: electrolytic capacitor
10: capacitor element
  1: anode body
  2: anode wire
    2a: first portion
    2b: second portion
  3: dielectric layer
  4: solid electrolyte layer
  5: cathode layer
    5a: carbon layer
    5b: metal paste layer
  6: anode section
  7: cathode section
  8: conductive adhesive
11: package body
13: anode lead terminal
14: cathode lead terminal
  14a: joint area
101A to 101C: principal surface of anode body
102A to 102C: connection surface
103A: second connection surface

The invention claimed is:

1. An electrolytic capacitor, comprising:
a capacitor element including:
  an anode body being porous;
  a dielectric layer formed on a surface of the anode body; and
  a solid electrolyte layer covering at least part of the dielectric layer, wherein:
  the anode body has a plurality of principal surfaces and a corner portion,
  the corner portion includes a plurality of side portions and a vertex portion, the side portions and the vertex portion each connecting between the principal surfaces,
  a surface layer X of at least part of the corner portion is more compact in texture than a surface layer Y of the principal surface adjacent to the surface layer X,
  a porosity $P_1$ in the surface layer X is smaller than a porosity $P_2$ in the surface layer Y, and
  the surface layer X has a portion where the porosity $P_1$ is 10% or less.

2. The electrolytic capacitor according to claim 1, wherein in the corner portion, at least part of a portion including the surface layer X has a curved shape or a chamfered shape.

3. The electrolytic capacitor according to claim 2, wherein the surface layer Y is adjacent to a portion having the curved shape or the chamfered shape of the corner portion.

4. The electrolytic capacitor according to claim 2, wherein the portion having the curved shape or the chamfered shape of the corner portion includes a portion having a radius of curvature R of 20 μm to 500 μm.

5. The electrolytic capacitor according to claim 2, wherein the portion having the curved shape or the chamfered shape of the corner portion includes portions differing in the radius of curvature R, with a difference between maximum and minimum of the radii of curvature different from each other being 350 μm or less.

6. The electrolytic capacitor according to claim 1, wherein the surface layer X and the surface layer Y have a portion having a ratio $P_2/P_1$ of the porosity $P_2$ to the porosity $P_1$ satisfying 5 or more.

7. The electrolytic capacitor according to claim 1, wherein the solid electrolyte layer includes a conductive polymer.

8. The electrolytic capacitor according to claim 1, wherein the anode body is a sintered body of particles of a valve action metal.

9. A production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method comprising steps of:
  preparing the anode body;
  covering at least part of the anode body with the dielectric layer; and
  covering at least part of the dielectric layer with the solid electrolyte layer, wherein:

the anode body has a plurality of principal surfaces and a corner portion, the corner portion including a plurality of side portions and a vertex portion, the side portions and the vertex portion each connecting between the principal surfaces, and the step of preparing the anode body includes a step of irradiating a laser beam to at least part of the corner portion so that a porosity $P_1$ in a surface layer X of the at least part of the corner portion is smaller than a porosity $P_2$ in a surface layer Y of the principal surface adjacent to the surface layer X, and the surface layer X having a portion where the porosity $P_1$ is 10% or less.

10. The production method of an electrolytic capacitor according to claim 9, wherein the laser beam is not irradiated to at least part of one of the principal surfaces adjacent to the corner portion of the anode body.

11. The production method of an electrolytic capacitor according to claim 9, wherein the anode body is a sintered body of a metal powder, and the step of irradiating a laser beam is performed after the metal powder is sintered.

12. A production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method comprising steps of:

preparing the anode body;

covering at least part of the anode body with the dielectric layer; and covering at least part of the dielectric layer with the solid electrolyte layer, wherein:

the anode body has a plurality of principal surfaces and a corner portion, the corner portion including a plurality of side portions and a vertex portion, the side portions and the vertex portion each connecting between the principal surfaces, and the step of preparing the anode body includes a step of allowing media particles to collide with at least part of the corner portion so that a porosity $P_1$ in a surface layer X of the at least part of the corner portion is smaller than a porosity $P_2$ in a surface layer Y of the principal surface adjacent to the surface layer X, and the surface layer X having a portion where the porosity $P_1$ is 10% or less.

13. The production method of an electrolytic capacitor, according to claim 12, wherein the media particles has an average particle diameter of 0.1 mm to 3 mm.

14. A production method of an electrolytic capacitor, being a method for producing a solid electrolytic capacitor that includes a capacitor element including an anode body being porous, a dielectric layer formed on a surface of the anode body, and a solid electrolyte layer covering at least part of the dielectric layer, the method comprising steps of:

preparing the anode body;

covering at least part of the anode body with the dielectric layer; and covering at least part of the dielectric layer with the solid electrolyte layer, wherein the anode body has a plurality of principal surfaces and a corner portion, the corner portion including a plurality of side portions and a vertex portion, the side portions and the vertex portion each connecting between the principal surfaces, and the step of preparing the anode body includes a step of subjecting the anode body to vibration together with a vibration member so that a porosity $P_1$ in a surface layer X of the corner portion is smaller than a porosity $P_2$ in a surface layer Y of the principal surface adjacent to the surface layer X, and the surface layer X having a portion where the porosity $P_1$ is 10% or less.

15. The production method of an electrolytic capacitor according to claim 14, wherein the vibration member is a sieve.

16. An electrolytic capacitor, comprising:

a capacitor element including:

an anode body being porous;

a dielectric layer formed on a surface of the anode body; and a solid electrolyte layer covering at least part of the dielectric layer, wherein:

the anode body has a plurality of principal surfaces and a corner portion, the corner portion includes a plurality of side portions and a vertex portion, the side portions and the vertex portion each connecting between the principal surfaces, a surface layer X of at least part of the corner portion is more compact in texture than a surface layer Y of the principal surface adjacent to the surface layer X, a porosity $P_1$ in the surface layer X is smaller than a porosity $P_2$ in the surface layer Y, and the surface layer X and the surface layer Y have a portion having a ratio $P_2/P_1$ of the porosity $P_2$ to the porosity $P_1$ satisfying 5 or more.

* * * * *